United States Patent
Bruemmer

(10) Patent No.: US 10,226,864 B2
(45) Date of Patent: Mar. 12, 2019

(54) MODULAR ROBOTIC MANIPULATION

(71) Applicant: Humatics Corporation, Cambridge, MA (US)

(72) Inventor: David J. Bruemmer, Idaho Falls, ID (US)

(73) Assignee: Humatics Corporation, Cambridge, MA (US)

( * ) Notice: Subject to any disclaimer, the term of this patent is extended or adjusted under 35 U.S.C. 154(b) by 0 days.

(21) Appl. No.: 14/918,059

(22) Filed: Oct. 20, 2015

(65) Prior Publication Data

US 2016/0039091 A1 Feb. 11, 2016

Related U.S. Application Data

(63) Continuation of application No. 13/597,991, filed on Aug. 29, 2012, now Pat. No. 9,195,911.

(60) Provisional application No. 61/529,206, filed on Aug. 30, 2011.

(51) Int. Cl.
*B25J 9/16* (2006.01)
*G06K 9/00* (2006.01)
(Continued)

(52) U.S. Cl.
CPC ............. *B25J 9/1602* (2013.01); *B25J 9/08* (2013.01); *B25J 9/161* (2013.01); *B25J 9/1633* (2013.01);
(Continued)

(58) Field of Classification Search
CPC ... B25J 9/08; B25J 9/1602; B25J 9/161; B25J 9/1633; B25J 9/1666; B25J 9/1684;
(Continued)

(56) References Cited

U.S. PATENT DOCUMENTS 4,980,626 A 12/1990 Hess et al.
5,216,631 A 6/1993 Sliwa, Jr.
(Continued)

FOREIGN PATENT DOCUMENTS

DE 102008047143 A1 3/2010
EP 1702365 A2 9/2006
(Continued)

OTHER PUBLICATIONS

H. Koch, A. Konig, A. Weigl-Seitz, K. Kleinmann and J. Suchy, "Force acceleration and vision sensor fusion for contour following tasks with an industrial robot", Proc. IEEE Int. Symp. ROSE, pp. 1-6.*
(Continued)

*Primary Examiner* — Khoi H Tran
*Assistant Examiner* — Robert T Nguyen
(74) *Attorney, Agent, or Firm* — Wolf, Greenfield & Sacks, P.C.

(57) ABSTRACT

A system for interaction with a the environment includes an initial manipulation module operable to orient a device in a general direction of a surface of an object and a range control module operable to converge the device and the surface. Once the device and surface are in the proximity of each other a contact sensor detects when physical contact between the surface and the device occurs. Thereafter, a proprioception module measures normal force disparities between the surface and device motion actuators and finally, an exteroception module to measure translational resistance disparities between relative motion of the surface and the device. The system uses these disparity measurements and actuator positions to modify the manipulation of the device.

18 Claims, 5 Drawing Sheets

(51) Int. Cl.
  *G06K 9/62* (2006.01)
  *B25J 9/08* (2006.01)
  *G06F 3/01* (2006.01)
  *G06T 11/20* (2006.01)
  *G01C 21/34* (2006.01)
  *G08G 1/00* (2006.01)

(52) U.S. Cl.
  CPC ........... *B25J 9/1666* (2013.01); *B25J 9/1684* (2013.01); *B25J 9/1694* (2013.01); *B25J 9/1697* (2013.01); *G01C 21/34* (2013.01); *G06F 3/016* (2013.01); *G06K 9/00791* (2013.01); *G06K 9/6293* (2013.01); *G06T 11/206* (2013.01); *G08G 1/22* (2013.01); *Y10S 901/09* (2013.01); *Y10S 901/10* (2013.01)

(58) Field of Classification Search
  CPC ....... B25J 9/1694; B25J 9/1697; G01C 21/34; G06F 3/016; G06K 9/00791; G06K 9/6293; G06T 11/206; G08G 1/22; Y10S 901/09; Y10S 901/10
  USPC .......................................... 700/258; 901/10
  See application file for complete search history.

(56) References Cited

U.S. PATENT DOCUMENTS

| | | | |
|---|---|---|---|
| 5,526,357 A | 6/1996 | Jandrell | |
| 5,655,148 A | 8/1997 | Richman et al. | |
| 5,748,980 A | 5/1998 | Lipe et al. | |
| 5,889,926 A | 3/1999 | Bourne et al. | |
| 5,999,989 A | 12/1999 | Patel | |
| 6,092,021 A | 7/2000 | Ehlbeck et al. | |
| 6,216,631 B1 | 4/2001 | Wissner-Gross | |
| 6,226,692 B1 | 5/2001 | Miloushev et al. | |
| 6,317,686 B1 | 11/2001 | Ran | |
| 6,496,108 B1 | 12/2002 | Baker et al. | |
| 6,708,068 B1 | 3/2004 | Sakaue | |
| 6,675,070 B2 | 6/2004 | Lapham | |
| 6,889,118 B2 | 5/2005 | Murray, IV et al. | |
| 6,931,546 B1 | 8/2005 | Kouznetsov et al. | |
| 7,065,638 B1 | 6/2006 | Chlytchkov | |
| 7,152,033 B2 | 12/2006 | Gupta et al. | |
| 7,211,980 B1 | 5/2007 | Bruemmer et al. | |
| RE39,907 E | 11/2007 | Hong | |
| 7,584,020 B2 | 9/2009 | Bruemmer et al. | |
| 7,587,260 B2 | 9/2009 | Bruemmer et al. | |
| 7,620,477 B2 | 11/2009 | Bruemmer | |
| 7,668,621 B2 | 2/2010 | Bruemmer | |
| 7,778,632 B2 | 8/2010 | Kurlander et al. | |
| 7,778,769 B2 | 8/2010 | Boss et al. | |
| 7,801,644 B2 | 9/2010 | Bruemmer et al. | |
| 7,877,198 B2 | 1/2011 | Tenzer et al. | |
| 7,974,738 B2 | 7/2011 | Bruemmer et al. | |
| 8,073,564 B2 | 12/2011 | Bruemmer et al. | |
| 8,112,203 B2 | 2/2012 | Shin et al. | |
| 8,155,868 B1 | 4/2012 | Xing et al. | |
| 8,190,319 B2 | 5/2012 | Syed et al. | |
| 8,660,694 B2 | 2/2014 | Lurz et al. | |
| 8,855,813 B2* | 10/2014 | Ziegler ..................... A47L 5/14 700/245 | |
| 8,972,053 B2 | 3/2015 | Bruemmer et al. | |
| 9,053,222 B2 | 6/2015 | Lynn et al. | |
| 9,195,911 B2* | 11/2015 | Bruemmer ......... G06K 9/00791 | |
| 9,586,314 B2 | 3/2017 | Bruemmer | |
| 9,731,417 B2 | 8/2017 | Bruemmer et al. | |
| 9,971,339 B2* | 5/2018 | Maloney ................ B25J 9/1684 | |
| 2003/0171846 A1 | 9/2003 | Murray, IV et al. | |
| 2005/0021186 A1 | 6/2005 | Murray, IV et al. | |
| 2005/0145837 A1 | 7/2005 | Chan et al. | |
| 2006/0074525 A1 | 4/2006 | Close et al. | |
| 2006/0074535 A1 | 4/2006 | Gim et al. | |
| 2006/0117324 A1 | 6/2006 | Alsafadi et al. | |
| 2006/0161315 A1 | 7/2006 | Lewis et al. | |
| 2007/0106152 A1* | 5/2007 | Kantrowitz .......... A61N 5/1049 600/424 |
| 2007/0112475 A1 | 5/2007 | Koebler et al. | |
| 2007/0112714 A1 | 5/2007 | Fairweather | |
| 2007/0174004 A1 | 7/2007 | Tenzer et al. | |
| 2007/0206849 A1 | 9/2007 | Sakata et al. | |
| 2007/0208442 A1 | 9/2007 | Perrone | |
| 2008/0009968 A1 | 1/2008 | Bruemmer et al. | |
| 2009/0082879 A1 | 3/2009 | Dooley et al. | |
| 2009/0307772 A1 | 12/2009 | Markham et al. | |
| 2010/0008270 A1 | 1/2010 | Ahn et al. | |
| 2010/0076878 A1 | 3/2010 | Burr et al. | |
| 2010/0251822 A1* | 10/2010 | Isobe ................... G01N 29/069 73/606 |
| 2010/0274388 A1* | 10/2010 | Hagenauer ............. B23K 11/25 700/250 |
| 2010/0305806 A1 | 12/2010 | Hawley | |
| 2010/0328073 A1* | 12/2010 | Nikitin .................. G01S 5/0247 340/572.1 |
| 2010/0332113 A1 | 12/2010 | Tengler et al. | |
| 2011/0029289 A1* | 2/2011 | Guerrero ............... E21B 23/002 703/1 |
| 2011/0060495 A1 | 3/2011 | Kono et al. | |
| 2011/0066324 A1 | 3/2011 | Odland et al. | |
| 2011/0208399 A1 | 8/2011 | Fekete et al. | |
| 2011/0213495 A1* | 9/2011 | Orita ....................... B25J 9/163 700/254 |
| 2011/0224828 A1 | 9/2011 | Breznak et al. | |
| 2011/0313647 A1 | 12/2011 | Koebler et al. | |
| 2012/0027258 A1* | 2/2012 | Uchida .............. G06K 9/00805 382/103 |
| 2012/0041592 A1 | 2/2012 | Murray, IV et al. | |
| 2012/0136475 A1* | 5/2012 | Kahle ..................... G01S 5/0221 700/182 |
| 2012/0271723 A1 | 10/2012 | Penilla et al. | |
| 2012/0287749 A1 | 11/2012 | Kutlik et al. | |
| 2013/0024065 A1* | 1/2013 | Chiu ....................... G05D 1/027 701/26 |
| 2013/0050121 A1* | 2/2013 | Bruemmer ......... G06K 9/00791 345/173 |
| 2013/0050180 A1 | 2/2013 | Bruemmer | |
| 2013/0054023 A1 | 2/2013 | Bruemmer et al. | |
| 2013/0054024 A1 | 2/2013 | Bruemmer et al. | |
| 2013/0066511 A1 | 3/2013 | Switkes et al. | |
| 2013/0154668 A1* | 6/2013 | Leflour ................... G01N 22/02 324/637 |
| 2013/0211594 A1* | 8/2013 | Stephens, Jr. .......... B25J 9/1689 700/259 |
| 2014/0049429 A1* | 2/2014 | Bruemmer ............. G01S 5/0289 342/463 |
| 2014/0052293 A1* | 2/2014 | Bruemmer ............ G05D 1/0088 700/248 |
| 2014/0197926 A1* | 7/2014 | Nikitin ................. G06K 7/10009 340/10.1 |
| 2015/0269757 A1 | 9/2015 | Bruemmer | |
| 2015/0285646 A1 | 10/2015 | Bruemmer et al. | |
| 2016/0039091 A1 | 2/2016 | Bruemmer | |
| 2017/0182657 A1* | 6/2017 | Rose ........................ G01L 1/16 |

FOREIGN PATENT DOCUMENTS

| | | |
|---|---|---|
| EP | 2036777 A1 | 3/2009 |
| WO | WO 2006/057645 A2 | 6/2006 |
| WO | WO 2009-07069 A1 | 6/2009 |
| WO | WO 2010-011806 A1 | 1/2010 |
| WO | WO 2010/028626 A1 | 3/2010 |
| WO | WO 2010-134824 A1 | 11/2010 |
| WO | WO 2012-061932 A1 | 5/2012 |

OTHER PUBLICATIONS

International Search Report and Written Opinion of International Searching Authority; Jan. 22, 2013; PCT/US2012/053066.
International Search Report and Written Opinion of the International Searching Authority; Apr. 29, 2013; PCT/US2012/053056.
International Search Report and Written Opinion of the International Searching Authority; Apr. 24, 2013; PCT/US2012/053070.

(56) References Cited

OTHER PUBLICATIONS

International Search Report and Written Opinion of the International Search Authority; May 24, 2013; PCT/US2012/053077.
[No Author Listed], Evolution Robotics Users Guide. ERSP 3.0. Robotic development platform 2001-2004. 177 pages.
[No Author Listed], Microcontroller UART Tutorial, Accessed May 19, 2009. Society of Robots. http://www.societyofrobots.com/microcontroller_uart.shtml 9 pages.
Alur, R., et al.; A Framework and Architecture for Multirobot Coordination; GRASP Lab and SDRL Lab, University of Pennsylvania, Philadelphia, USA. 11 pages.
Bannach, David, et al.; Distributed Modular Toolbox for Multi-Modal Context Recognition; 1—UMIT, Hall in Tyrol, Austria; 2—Wearable Computing Lab, ETH Zurich, Switzerland. 15 pages.
Brooks, Rodney A; Planning is Just a Way of Avoiding Figuring Out What to Do Next; MIT. 1987. 6 pages.
Bruyninckx, Orocos: Design and implementation of a robot control software framework. http://www.orocos.org 2002. 1-9.
Collins, Robert T., et al.; Algorithms for Cooperative Multisensor Surveillance. Proceedings of the IEEE. vol. 89, No. 10, Oct. 2001. 22 pages.
Duran-Limon, A Resource Management Framework for Reflective Multimedia Middleware. Computing Department Lancaster University. A Thesis Submitted for the degree of Doctor of Philosophy. Oct. 2001. 233 pages.
Fardi, Basel, et al.; Shape and Motion-Based Pedestrian Detection in Infared Images. A Multi Sensor Approach; Chemnitz University of Technology, Chemnitz, Germany; 2005 IEEE. 6 pages.
Ferrell, Cynthia; Robust Agent Control of an Autonomous Robot with Many Sensors and Actuators; MIT. 165 pages.
Fierro, Rafael, et al.; A Framework and Architecture for Multi-Robot Coordination; International Journal of Robotics Research. 2002 21:977. 20 pages.
Hester, Todd et al; RTMBA: A Real-Time Model-Based Reinforcement Learning Architecture for Robot Control; Dept. of Computer Science, UT Austin. IEEE International Conference on Robotics and Automation; St. Paul, MN, USA May 2012. 6 pages.
Kanade, Takeo, et al.; Advances in Cooperative Multi-Sensor Video Surveillance; Robotics Institute, Carnegie Mellon University, Pittsburgh, PA. 22 pages.
Kuipers, Benjamin, et al.; A Robot Exploration and Mapping Strategy Based on a Semantic Hierarchy of Spatial Representations; UT Austin; 8279 Robotics and Autonomous Systems (8)Nov. 1991, No. ½, Amsterdam, NL. 17 pages.
Munich et al. ERSP: A Software Platform and Architecture for the Service Robotics Industry. International Conference on Intelligent Robots and Systems. 2005. IROS 2005. IEEE/RSJ. Evolution Robotics, Inc. 1-8.
Sanjeepan, A Service-Oriented, Scalable, Secure Framework for Grid-Enabling Legacy Scientific Applications. A Thesis Presented to the Graduate School of the University of Florida in Partial Fulfillment of the Requirements for the Degree of Master of Science. University of Florida. 2005. 96 pages.
Seyfarth et al., Open System Architecture for Controls within Automation Systems (OSACA). The Industrial Informational Technology Handbook. CRC Press LLC. 2005. 13 pages.
U.S. Appl. No. 14/941,199, filed Nov. 13, 2015, Bruemmer.

* cited by examiner

MODULAR ROBOTIC MANIPULATION

RELATED APPLICATIONS

The present application is a continuation of and claims the benefit under 35 U.S.C § 120 of priority to U.S. Non-Provisional patent application Ser. No. 13/597,991 filed Aug. 29, 2012 which in turn claims priority to U.S. Provisional Application 61/529,206 filed Aug. 30, 2011, both of which are hereby incorporated by reference in their entirety for all purposes as if fully set forth herein. The present application is further related to the following commonly assigned patent applications: U.S. patent application Ser. No. 13/597,791 entitled, "Asynchronous Data Stream Framework", U.S. patent application Ser. No. 13/597,911 entitled, "Vehicle Management System", U.S. patent application Ser. No. 13/598,021 entitled, "Graphical Rendition of Multi-Modal Data," and U.S. patent application Ser. No. 13/598,114 entitled, "Universal Payload Abstraction," all of which were filed on Aug. 29, 2012.

BACKGROUND OF THE INVENTION

Field of the Invention

Embodiments of the present invention relate, in general, to mobile manipulation coordination and more particularly, to mobile manipulation coordination using proprioceptive and touch-based reactive response behaviors.

Relevant Background

Moving from one point to another is not a simple task. For example, it takes an infant close to 18 months before it can easily perceive and traverse its environment. In doing so the child has developed the ability to use its senses to acquire data about the surrounding environment, build a model of sort of the environment and initiate its journey. And while moving from one point to another it continually reevaluates the conditions in which it is moving, making adjustments along the way. When an individual, child or adult, comes across an obstacle a plurality of processes, most of which are subconscious, are undertaken before any action is initiated. Imagine a hiker on a mountain trail. While the goal is clear, follow the trail to the destination, each step involves careful analysis. The terrain is often uneven and surface unreliable. While a visual interpretation may indicate that a stone on which to place the next step is secure, the initial contact with the stone confirms the legitimacy of the prior conclusion. Humans take this type of motion and manipulation of objects for granted as can be appreciated by the challenges that have been faced in trying to reproduce similar behavior in machines.

Traditional approaches to accomplishing something as simple as the height control of a device accept a prior knowledge of the surrounding environment, such as an existing 3D model, or use a downward and/or outward looking range sensor to build up an accurate, persistent model of the surrounding terrain or surface. These approaches then use a joint space iterative model to track the position of the vehicle and arm's 3D position and orientation within this model. The difficulty with this approach is that it requires additional perceptual hardware and inertial sensing solution to track the device's pitch and roll within the model. But humans do not develop a precise model and then operate solely based on that model and the ability to understand its relationship to that model.

For example consider a soldier using a scanning mine detector. Although the operators of such devices are told to keep the sensor head a couple of inches from the ground, many operators have been observed actually allowing the sensor head to periodically brush against the ground as a means to reactively understand and follow the contours of the ground. Many human tasks involve light touch as a means of gaining continuous data by which to modulate movement.

Without a certain level of reactive feedback driven control, the ability of a device such as a robot to use perception and planning is limited by the propensity for an error to exist in the model and an error to occur in the execution of the motion plan. Manipulation of devices today is based on the development and use of a sophisticated 3D model which is used as the primary foundation by which to base movements. Current devices have little information of how they interact with actual environment but rather carefully track their position with respect to a mathematical model. For example, a robot of today could state that one of its arms is 0.5 inches from the modeled surface of an object, but it could not accurately determine whether the arm is actually 0.5 inches from the surface or that the model of the surface fails to recognizes a small outcropping which actually paces the arm within 0.1 inches of the surfaced. Unfortunately, it is this type of perception that has been the primary focus of work in manipulation over the past several years. A challenge remains for a system that can respond adroitly to a surface or an object possessing features that are not properly or correctly captured in a model. These and other challenges of the prior art are addressed by one or more embodiments of the present invention.

SUMMARY OF THE INVENTION

Disclosed hereafter is a system and corresponding methods that can skillfully interpret and react to unrecognized and non-modeled defects, obstacles and other challenges. The present invention provides a means by which a device can recognize and adapt to model errors, perception inaccuracies, dynamic changes in the environment or temporal errors. The present invention uses an approach that allows a device to follow the contours of the environment primarily by responding to continuous tactile and/or visual feedback regarding perceived disparities (sometimes minute) between expected and actual motion and/or contact.

Just as a human may reach out for a door, understanding the general position of the door based on the "model" that has been developed by their senses, the person would modify its motion based on a new and expected feeling of touch. Perhaps the door had in-perceptively moved closer and thus contact was made prior to what was planned. In such a case the individual would adjust the motion of their arm based on the new information.

Biological models such as suggested above indicates that it is the function of the cerebellum to interpret changes in the real time and to dynamically adjust motion. Higher level motion coordination approaches based on 3D perception and planning of the prior art only work when they are supported by lower level primitives for reaching and grasping as well as feedback driven behaviors that operate outside of the deliberative plan to respond to changes and inaccuracies on the fly. Humans tend to have conscious awareness of the higher level functions while not understanding or even being aware of the need for coordination at a low level. Yet it is, however, this low-level coordination that is responsible for skill and represents the essential ingredient necessary for accomplishing dexterous manipulation in the real world.

According to one embodiment of the present invention, a system for interaction with a surface of an object includes an initial manipulation module operable to orient a device in a general direction of the surface and a range control module operable to converge the device and the surface. Once the device and surface are in the proximity of each other a contact sensor detects when physical contact between the surface and the device occurs. Thereafter, a proprioception module measures normal force disparities between the surface and device motion actuators and finally, an exteroception module to measure translational resistance disparities between relative motion of the surface and the device. The system uses these disparity measurements and actuator positions to modify the manipulation of the device.

According to one aspect of the present invention, the manipulation of the device can be controlled so as to maintain a certain normal force or "touch" force as the device moves forward. For example, imagine a person lightly touching a curvilinear object. In the same manner, the present invention enables a component to reach out, make contact with the targeted surface, and maintain the same normal force (touch) as the device traces the object's outline. Just as a human can lightly traces the curves of a fragile object so as to perceive its shape while exerting only a minimal (or predetermined) amount of normal force.

The systems of the present invention are further embodied as a method for touch based interaction with a surface comprising orienting a device with respect to a surface, converging the device to the surface so as to make contact, measuring a normal and translational force between the device and the surface and independently controlling motion of the device to maintain a predetermined normal force and a predetermined translational resistive force. According to one embodiment, these forces can be controlled by a reactive impedance based behavior or similar technique.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

DESCRIPTION OF THE INVENTION

Figure 1:
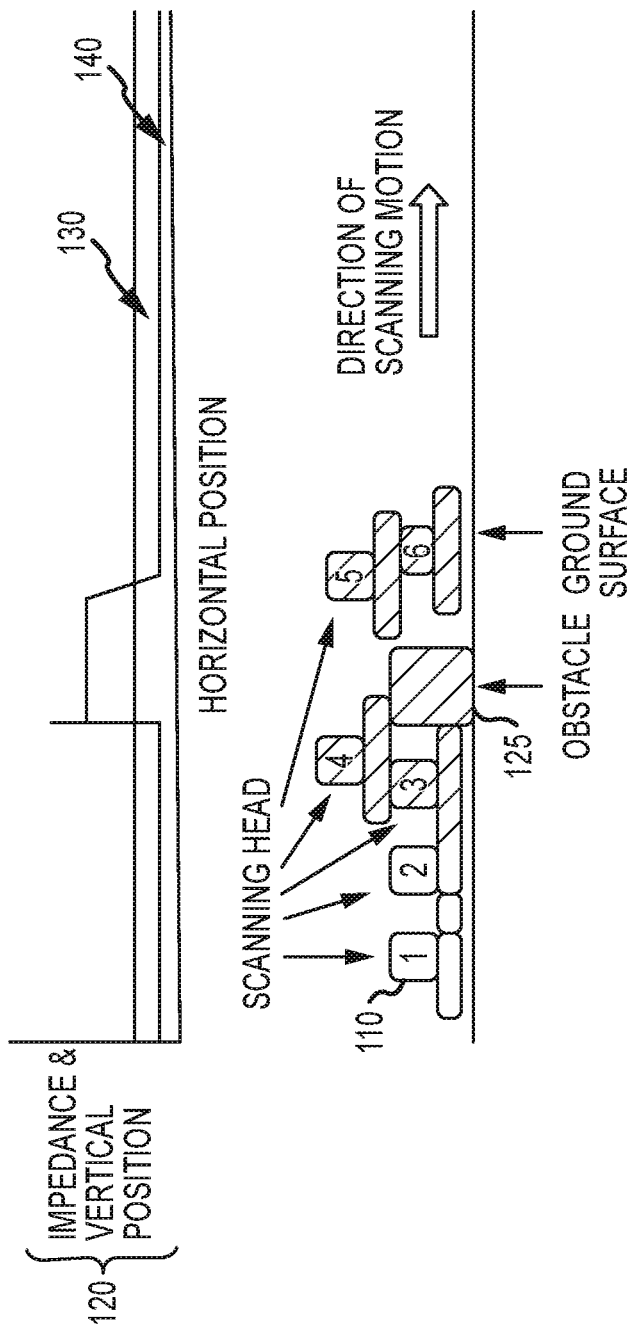
FIG. 1 shows high level graphic of impedance and vertical position plot regarding a surface scanning head's encounter with an obstacle according to one embodiment of the present invention.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

A system for contour following and mobile device manipulation is hereafter presented by way of example. According to one embodiment of the present invention, traditional approaches of manipulation control such as inverse kinematics are combined with proprioceptive and touch-based reactive response behaviors to provide a means by which a device that is reactive to encountered obstacles. Using the techniques described herein, a mobile device can be manipulated so as to control reaching, grasping, scanning, sampling, and contour following in a reactive and dynamic manner. Just as in cognitive planning and model construction, the present invention reactively controls the motion of a device by making timing adjustments (synchronization and motion primitives), initiating local coordination communications and applying real-time reactions to environmental changes in response to a variety of changing conditions and data values.

The present invention enables a device, such as a manipulated arm, to respond adroitly to obstacles and surfaces that are not correctly or adequately captured in a three-dimensional model. The present invention provides a series of independent modules which each provides systematic responses to address particular errors such as model errors, actuator or manipulative arm errors (actuator errors), perceptual inaccuracies, dynamic changes in the environment that are not reflected in the model, lag time and temporal errors.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used by a device to interact with a surface. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a nonexclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for an interaction system for a distributed tangible user interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The general concepts of the present invention can be better understood in consideration of the following example illustrated in FIG. 1. FIG. 1 shows high level graphic of impedance and vertical position plot regarding a surface scanning head's encounter with an obstacle according to one embodiment of the present invention. A scanning head or scanning device 110 moves along the surface from left to right. At positions 1, 2, and 3 the scanning head 110 maintains a certain distance above the ground surface. By doing so the scanning head 110 encounters a certain amount of translational resistance represented by an impedance value 130 on an impedance versus horizontal position graph 120.

As the scanning head 110 encounters an obstacle 125 the impedance value 130 spikes. Forward motion of the scanning head 110 is stopped. To overcome the obstacle 125 the scanning head 110 is raised above the ground surface to a position that overcomes the obstacle 125. Referring to the impedance versus horizontal position graph 120 it can be seen that the impedance value drops to a value comparable to that prior to encountering the obstacle 125. While the vertical position 140 of the scanning head 110 is above the ground surface impedance value indicates that there is no obstruction to the forward motion of the scanning head 110. As the scanning head 110 continues to move forward the obstacle 125 is overcome and displaced. At position 5 the scanning head 110 is no longer in contact with the obstacle and thus can return to the predetermined distance above the ground surface. Throughout this procedure the impedance or translational resistance experienced by the scanning head 110 is constant.

The present invention manipulates the position of the device, in this case the scanning head 110, in response to variations in translational resistance, i.e. impedance. According to one embodiment of the present invention, errors are identified, perceived, and acted upon with respect to the manipulation or translation of a device. One element of error perception is the ability to detect positional errors. For example the error in distance between the expected position of an arm (device) in relation to the surface and the actual measured distance of the arm from the surface. Fuzzy logic is, in one embodiment, implemented to reduce the distance between the device and surface until contact is made. Once contact is made, both normal and translational forces are monitored to provide the invention with the ability to perceive the surface.

Another element of the present invention (which can be used in parallel or in sequence with the steps described above) is likened to what humans do to turn off an alarm clock in the dark. According to one embodiment of the present invention, a manipulative arm uses a rough reach or guess together with touch feedback as means to reactively modulate contour following, scanning and contact with a surface.

Accordingly, one or more embodiments of the present invention enables precise manipulation to be effective even when perception of the environment is imperfect or infeasible due to cost, conditions or similar factors. To use the alarm clock example, even when the light is on and the alarm buzzing, humans roughly estimate the direction in which to reach, initiate a basic reach motion primitive without even looking at the clock. Once the alarm is encountered the waking individual modifies the reach based on an initial touch.

This is one of the reasons why following the contour of a surface for humans is easy when it can not be touched, but surprisingly difficult when humans are asked to follow that same contour but to do so just slightly above the surface. The present invention provides a touch-based approach of contact sampling and scanning. To do so the present invention ensures that only the very lightest pressure is exerted by the arm up to the point of contact and responds smoothly and quickly to changes in distance and/or contact pressure. Thus, the system of the present invention responds reactively to unseen or imperfectly modeled obstructions that may hinder motion.

According to one embodiment of the present invention, a system for contour following or mobile manipulation includes a plurality of different levels or subroutines that enabled devices to react to a changing environment. Each of these levels operate in a different update rate providing multiple feedback and iterative loops so as to provide a best possible response supported by sensors and actuators. The various subroutines or iterative loops of the present invention can be called in sequence or in parallel and can be nested in a recursive fashion so that one subroutine runs within the execution of another.

The contour following and mobile device regulation process begins with what is known as a reach behavior or an initial move designed to establish contact or close proximity with the surface. This behavior can be deliberate such as a planned reach to a certain position or repositioning of a device to a certain geospatial location or a generic or crude extension of the device in the general direction of which the surface is believed to exist.

For the purpose of the present invention its deliberative approach employs inverse kinematics approaches to extend a device by controlling individual actuator joints or mechanisms according to a carefully crafted algorithm that optimizes certain features such as energy efficiency or the ability to apply a certain force in a particular direction.

Alternatively, a "rough" reach approach places the arm or similar device in a position toward which is believed the surface exists. For example, an arm may be commanded to a rotational angle so as to be aligned with what is understood to be an object of interest and an object within the visual field of the device. This type of approach can also use a range sensor to bring the device (arm) within a certain range of the near surface on certain azimuth or vector. Once the reach behavior is completed, a behavior control process is initiated that orchestrates the remaining aspects of the contour following behavior.

Another aspect of the present invention is a reactive range based control system in which visual feedback can be reduced to an optical flow and in which minute changes in optical flow can be used to queue the motion of the device. In doing so, local error reconciliation is used to minimize reaching and grasping discrepancies in which the differences between the position of the device and the position of the surface can be manipulated. In addition, device-surface disparity can be calculated as the perceived perpendicular gap distance between the device and the surface to be manipulated or scanned. This value can be perceived from a range sensor, by a vector sensor that scans the surface, or by a single beam range sensor that provides the perpendicular distance from the device to the surface.

Once the device or the manipulative arm is within a predetermined range of surface, proprioceptive feedback is used to fine-tune the interaction between the device and the surface. Proprioceptive feedback pertains to proprioception, or the awareness of posture, movement, and changes in equilibrium and the knowledge of position, weight, and resistance of objects as they relate to the body. For example, proprioceptive feedback is the ability of the body to sense the movement positions of its muscles without visual guides and is essential for hand eye coordination. A proprioceptive defect would be as if the device is unaware of the position of its components.

With respect to the present invention a disparity in proprioceptive feedback is calculated as an expected force encountered by the motion of actuators as an attempt to move a device or arm against the surface. Alternatively, a proprioceptive disparity can be recognized as an unexpected force encountered as the arm is placed a specific distance away from the surface. For example, if a manipulative arm is to be placed within one inch of a mottled surface the actuators moving the arm should encounter no resistance other than the weight of the arm itself. Should the actuator find an increased resistance at a certain point in the extension process there exists a proprioceptive disparity. In a contact operation, the motion applied by the device in a direction of the surface is defined to be inversely proportional to the contact force experienced by the actuators. In contrast, in a scanning operation, the motion applied to a device in a direction away from the surface is defined to be proportional to the unexpected force encountered by the actuators.

The proprioceptive feedback described above is analyzed in conjunction with resistance to motion as the arm or device moves across the surface. To do so, the expected velocity and position of the device is compared to an actual-based motion sensation. This can be measured by responding to an unexpected impedance or quick draw in current.

Generally, the perceptual and planning based approaches control actuators and similar devices to move the device in generally the right direction based on predetermined criteria or user selections. As the device moves, a variety of other behaviors respond to discrepancies between the expected model of the environment in which the device is operating and real-world sensations. For example, a robot traversing what is understood to be a flat, level surface would not expect to encounter any obstacles or unusual drawings of current. Sensors such as encoders, force sensors, and visual feedback devices can provide valuable data to the system as it encounters disparities between the existing model and real world events.

As real-world events are encountered, real-time responses to a contact force and/or resistance to motion can be developed. For example, consider a device scanning the surface of the ground looking for buried articles. Normally the only resistance the actuators would experience is that of gravity i.e., the weight of suspending the arm over the ground. If an obstacle is encountered, a spike in the impedance value will be experienced. The present invention extends to encounter combinations to include, but not limited to, current draw, inertial measurements, positional data, and force feedback.

The present invention allows the device to respond skillfully to these modulations in current combined with the failure to advance caused by an obstruction or obstacle.

According to one embodiment of the present invention, each behavior subroutine involves a fuzzy logic controller that moves the device away from the encountered surface with a velocity and/or force that is proportional to the calculated arm-surface contact disparity. The disparity is calculated differently for each of the behavior subroutines. The behavior system of the present invention calls the subroutines from inside of a single main event loop such that each subroutine's update rate is limited to the update rate of the arm control disparity calculation. This means that each subroutine is called at a rate appropriate for the key data involved. The vision based control is based on the visual feedback update rate while the proprioceptive behavior subroutine updates depending on the force feedback from the actuator joints and the resistance to motion updates based on the slowest of force torque sensors, power draw feedback, and encoder data update rate.

According to another embodiment the present invention, the reactive behaviors described above augment the more traditional planning centric approaches using proprioceptive, biologically-inspired approaches to deal with those cases in which something does not "fit" the model. Examples of such cases include visual obstructions or shadows which prevent a full visual model or situations were the object to be grasped has moved slightly. In such cases, the reactive behaviors allow the system functionality to degrade gracefully even as the model matches less and less with reality.

Figure 2:
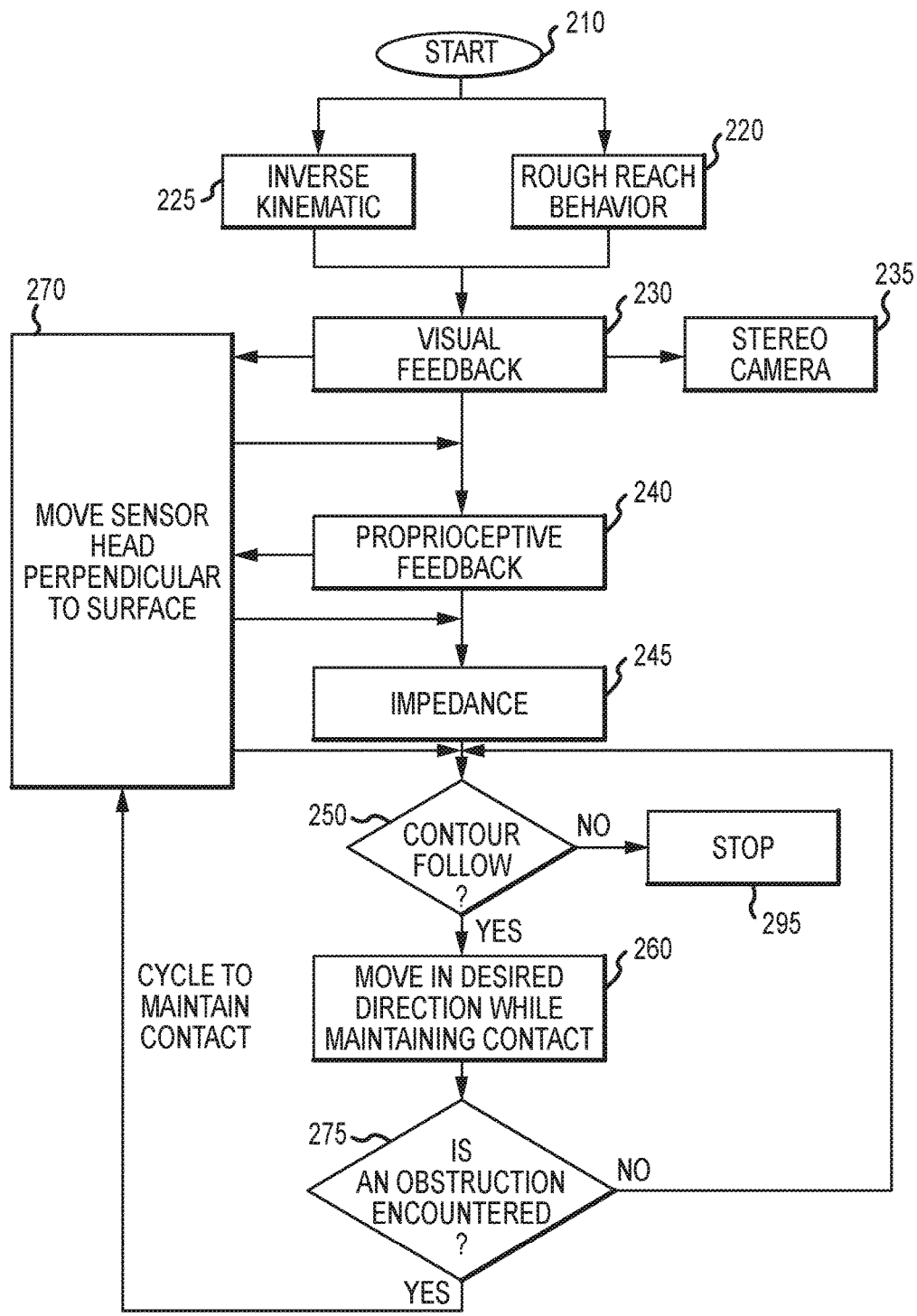
FIG. 2 is a flowchart of one method embodiment for contour following behavior according to the present invention.

The aforementioned description of the present invention can be better understood in consideration of the procedures and processes depicted in FIG. 2. FIG. 2 shows a flowchart of a contour following behavior according to one embodiment of the present invention. As previously described, contour following begins 210 with a reach 220, 225 in the general direction of a surface. The reach behavior involves a combination of inverse kinematics 225 and a rough reach behavior 220. With the manipulative arm or device positioned in proximity of the surface visual feedback 230 provides data with which to refine the position of the arm. According to one embodiment of the present invention, a stereo camera 235 or similar device is used to watch the gap between the arm and the surface close.

With the device or manipulative arm sufficiently close to the surface, proprioceptive feedback 240 is engaged until contact is made with the surface. Positional encoders and force feedback sensors operate along with direct pressure sensors to determine when the arm or device actually engages the surface.

Unexpected impedance 245 is used to detect and confirm disparities between expected velocity and positional data once contact is established. Using the impedance data 245, the contour following behavior queries mission logic to determine whether the device or arm should follow the surface contours 250. If the mission logic does not dictate a contour following approach, the process ends 295. However, if contour following remains in mission objective, the arm or device is moved in the desired direction while maintaining contact with the surface 260.

As the arm or device is moved according to mission logic 260 across the surface increased resistance measured impedance values by the actuators driving the arm invoke logic by which the position of the arm so as to reduce impedance values to their original value, thus following the surface contour. As this occurs a continual inquiry is conducted whether an obstacle is encountered 275 stopping forward progress. When the answer to the query is "no," the contour following process (impedance analysis) continues. However, if an obstacle is encountered and forward progress is halted, the arm is manipulated to overcome the obstacle.

When an obstacle is encountered, the contour following sensor is raised above the surface until a combination of factors indicates that the obstacle has been overcome. These factors include a significant reduction in impedance value as well as proprioceptive and visual feedback. One of reasonable skill in the relevant art will recognize that other forms of sensor data can also be used by the system of the present invention to determine whether an obstacle has been overcome and to continue with forward motion. As the system adjusts, the position of the manipulative arm or device and additional data is gained from the visual systems 230, the proprioceptive feedback module 240, and the impedance 245 of the actuators and motors the arm is once again positioned to follow the surface contour 250.

Figure 3:
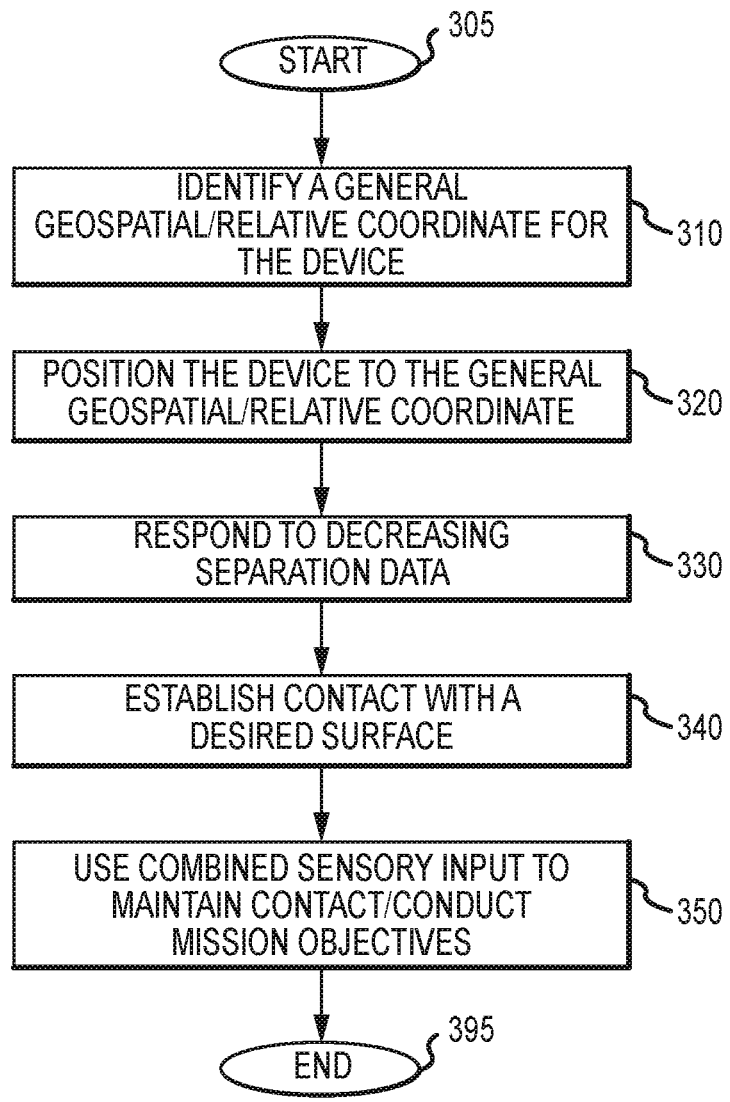
FIG. 3 is a flowchart of one method embodiment of process by which to control the robotic manipulative interaction with the environment according to the present invention.
Figure 4:
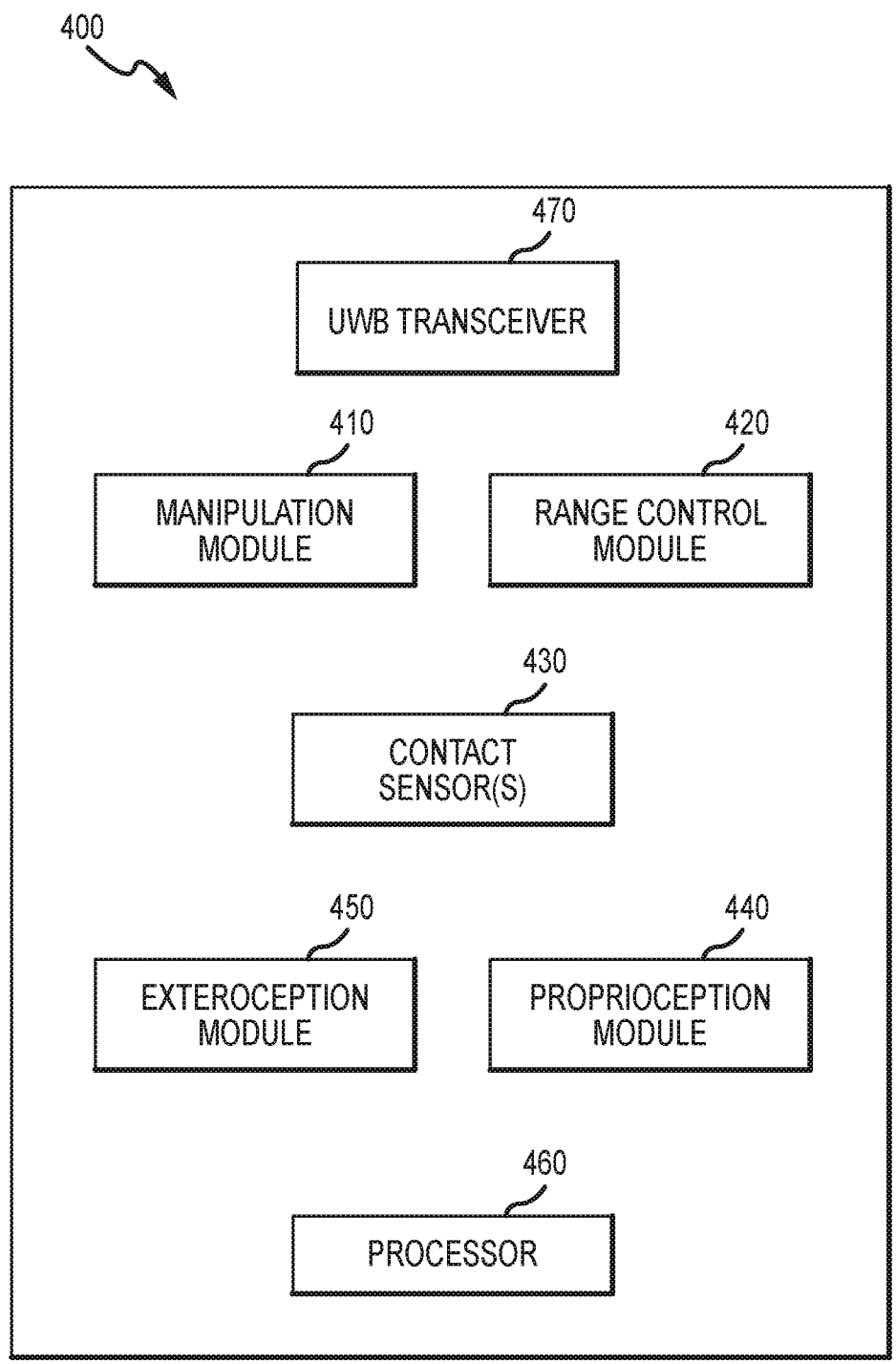
FIG. 4 is, according to one embodiment of the present invention, a high level block diagram of a system by which to control robotic manipulative interaction with the environment.

As described above, the process that initiates the contour following behavior begins with a reach action in which a manipulative arm or device is positioned in vicinity of the surface. Once a general position is obtained, several different processes are undertaken to bring the device into contact with and thereafter follow the surface. While the prior example was with respect to couture following the same basic concept of device manipulation can be applied to other tasks as is illustrated in FIG. 3, described below.

The process robotic manipulation begins 305 with the identification 310 of a general geospatial/relative coordinate for the device. As will be appreciated by one of reasonable skill in the relevant art, the process of reaching and interacting with the environment involves a complex interaction of sensory data, kinematic data, and the manipulation of various actuators and motors so as to position the device in the proper plane of motion relative to an object. Just as a human interacts with the environment, an individual uses a vast combination of sensory data to manipulate and adjust their motions. Another aspect of the present invention is the use of one or more active position ultra wide band (UWB) transceivers or tags. These ultra wide-band (UWB) radio frequency (RF) identification (ID) tag systems (collectively RFID) comprise a reader with an antenna, a transmitter, and software such as a driver and middleware. One function of the UWB RFID system is to provide positional information. Tags are usually affixed to objects so that it becomes possible to locate where the goods are without a direct line-of-sight given the low frequency nature of their transmission. A tag can include additional information other than the ID. For example, using triangulation of the tag's position and the identity of a tag, heading and distance to the tag's location can be ascertained. A single tag can also be used as a beacon for returning to a specific location or carried by an individual or vehicle to affect a follow behavior from other like equipped objects. As will be appreciated by one of reasonable skill in the relevant art, other active ranging technology is equally applicable to the present invention and is contemplated in its use. The use of the term "UWB", "tags" or "RFID tags," or the like, is merely exemplary and should not be viewed as limiting the scope of the present invention.

In one implementation of the present invention, a RFID and/or UWB tag cannot only be associated with a piece of stationary infrastructure with a known, precise, position, but also provide active relative positioning between movable objects. For example, even if the two or more tags are unaware of their precise position that can provide accurate relative position. Moreover, the tag can be connected to a centralized tracking system to convey interaction data. As a mobile object interacts with the tag of a known position, the variances in the objects positional data can be refined. Likewise, a tag can convey not only relative position between objects but relative motion between objects as well. Such tags possess low-detectability and are not limited to line of sight nor are they vulnerable to jamming. And, depending on how mounted and the terrain in which they are implemented, a tag and tracking system can permit user/tag interaction anywhere from 200 ft to 2-mile radius of accurate positioning. Currently, tags offer relative position accuracy of approximately +/−12 cm for each interactive object outfitted with a tag. As will be appreciated by one or reasonable skill in the relevant art, the use of the term object is not intended to be limiting in any way. While the present invention is described by way of examples in which objects may be represented by vehicles or cellular telephones, an object is to be interpreted as an arbitrary entity that can implement the inventive concepts presented herein. For example, an object can be a robot, vehicle, aircraft, ship, bicycle, or other device or entity that moves in relation to another. The collaboration and communication described herein can involve multiple modalities of communication across a plurality of mediums.

The active position tags of the present invention can also provide range and bearing information. Using triangulation and trilateration between tags, a route can be established using a series of virtual waypoints. Tags can also be used to attract other objects or repulse objects creating a buffer zone. For example, a person wearing a tag can create a 4-foot buffer zone which will result in objects not entering the zone to protect the individual. Similarly, a series of tags can be used to line a ditch or similar hazard to ensure that the object will not enter a certain region.

The first step in this general process, according to one embodiment of the present invention, is to identify the general geospatial/relative coordinate for which to place the manipulative arm or device 310. This identification can be the result of a plurality of sensory data to rise at an X, Y, Z positional coordinate. For example, in one embodiment this position can be enhanced using a pan and/or tilt angle from a camera combined with a relative angle (0-360) to specific target within a two-dimensional map. Additional information can be gained and assimilated from a three-dimensional range map. In other embodiments, global coordinates from a laser pointer global positioning system designator can assist in gaining a general position in which to place the device or manipulative arm. It is also possible to use internal coordinates from the robot internal model with respect to its arm and surface interaction as well as information from a higher layer level behavior which can provide detail with respect to the general target location.

As one of reasonable skill in the relevant art will appreciate, each of the techniques described above and the sensory data which is represented by each of these techniques, provide a system of the present invention the ability to position a manipulative arm or similar device generally. Just as the human reaches to grasp a device, the initial movement of the arm is based on a combined visual perception of where the individual stands and the device or target exists. This visual perception is combined with the heuristic knowledge of the location of one's hand with respect to one's body. So as the individual reaches toward the device, the initial motion to be quite rapid, slowing as the individual understands that his or her hand is arriving within the proximity of the target. In a similar matter, the present invention combines visual sensory data as well as understanding of the structural aspects and interaction of the robotic device so as to pre-position, or roughly position 320, the manipulative arm in the general location of the target prior to engaging other sensory data for refined interaction with the device.

Once the manipulative arm has arrived 230 at the determined general location, the separation between the manipulative arm and the target of interest or surface must be decreased until contact is initiated 330. This process of reducing the separation distance between the manipulative arm or the device and the surface or target of interest further involves a complex interaction and integration of a plurality of sensor inputs. Just as the human integrates his senses of sight and touch to ultimately come in contact with the target of interest, the present invention measures and analyzes the separation distance between the manipulative arm and the target of interest so as to manage and control the initial contact.

According to one embodiment of the present invention, stereo vision provides increasingly fine detail as to the distance between the manipulative arm and the surface as the gap between the two closes. Further estimations of the distance between the arm and the surface of interest can be gained by using a threedimensional LIDAR approach. Moreover, an estimation of the distance between the two surfaces can be gained by using a two-dimensional range vectors sensor to scan the approaching service. The data from these various sensors is integrated by the present invention to control the translation of the manipulative arm as it comes in contact with the surface of interest. One of reasonable skill in the relevant art will recognize that other sensory data provided by a variety of other sensors, contemplated but not listed in his disclosure, can be used with the present invention without departing from its scope and intent.

As the present invention responds 330 to decreasing separation data, or the gap distance between the manipulative arm and the surface of interest, proprioceptive feedback is gained to "feel" the gap decrease. In essence, the robotic arm feels the distance between the manipulative arm and the surface of interest decrease to the point of contact just as a human would feel their hand reaching out to an object until an initial contact is made. For example consider a human reaching for an alarm clock in a darkened room. As the individual reaches in the general direction or he or she understands the alarm clock to exist, initial motion may be very rapid and uncontrolled. But, as the hand becomes closer to what the individual perceives as the location of the alarm clock the motion is slowed and much more deliberate. Finally, using the sense of feel, the individual can interact with the environment to determine whether or not the alarm clock is at hand or if it needs to move one hand in a deliberate manner so as to initiate contact. Similarly, if one is reaching for either a hot or cold object the sense of feeling temperature to be indicative of how close the separation distance between the hand and the object is so as to adjust the speed and initiation of contact. The present invention employs a similar approach to reposition the manipulative arm once it has been moved to the general location of the object of interest.

Using a combination of fuzzy logic and inverse kinematics, the present invention deliberately initiates contact with the surface of interest 340. Once contact is been initiated, the present invention maintains contact as specified pressure or predetermined interaction profile so as to accomplish the mission objective. For example, the initial contact profile for engaging and interacting with the fragile target, an egg for example, would be considerably different than the initial contact profile for engaging a steel bar.

The present invention applies an understanding of how humans interact with environment to robotic behavior. Rather than relying simply on inverse kinematics utilizing a very precise and complex three-dimensional model by which to control the movement of devices associated with the robot, the present invention uses such a model as only one of many components to arrive at a desired interaction and manipulation of a device. Just as a human would quickly reach out to the surface but then slow its motion and increase its control as it becomes engaged with an object, the present invention roughly reaches out to a predetermined position, based on various sensory data, and then carefully closes the gap until surface contact is initiated. Once surface contact is initiated, it continues to interact with the environment and the device so as to maintain 350 a contour understanding of the surface so as to accomplish mission objectives, ending 395 the process. According to one embodiment of the present invention, a system 400 for interaction with a surface of an object includes a processor 460 that executes instructions associated with an initial manipulation module 410 to orient a first object in a general direction of a second object based on data transmitted by or received from a UWB transmitter/receiver/transceiver 470, and a range control module 420 that is operable to converge the first object and the second object. Once the objects are in proximity of each other a contact sensor 430 detects when physical contact between the objects. Thereafter, a proprioception module 440 measures normal force disparities between the surfaces of the objects and device motion actuators and finally, an exteroception module 450 to measure translational resistance disparities between relative motion of the surface of the objects. The system uses these disparity measurements and actuators positions to modify the manipulation of the first and second objects.

Figure 5:
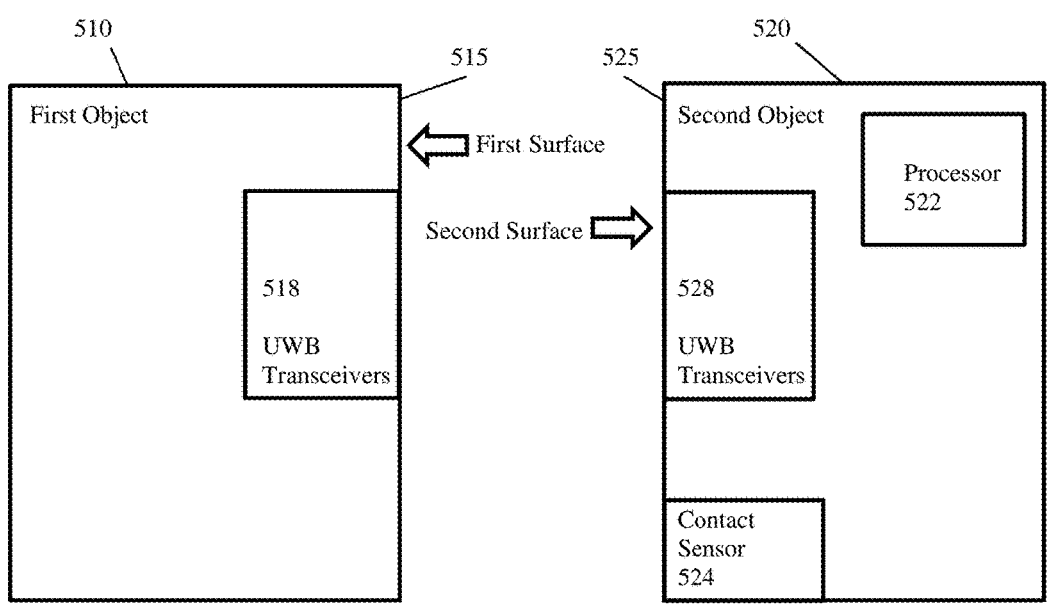
FIG. 5 shows a first object 510 in proximity of a second object 520.

FIG. 5 shows a first object 510 in proximity of a second object 520. The first object 510 comprises a first surface 515 and one or more UWB transceivers 518. The second object 520 comprises a second surface 525, two or more UWB transceivers 528, a contact sensor 524, and a processor 522.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a system for robotic manipulation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A system for controlling contact between two objects, comprising:

a plurality of sensors including a plurality of ultra-wide band (UWB) transceivers and a contact sensor wherein the plurality of UWB transceivers creates a relative coordinate for a first object and a second object and wherein the relative coordinate provides positional and translational information about the first object and the second object including error associated with the relative coordinate and wherein the contact sensor detects physical contact between the first object and a surface of the second object; and a processor configured to execute instructions and communicatively coupled to the plurality of sensors and to a non-transitory memory storing modules of instructions, including an initial manipulation module wherein the initial manipulation module selects a deliberative behavior to orient the first object with the second object based on the relative coordinate and the error associated with the relative coordinate awareness of the environment, a range control module wherein the range control module modifies the deliberate behavior based on the relative coordinate and the error associated with the relative coordinate awareness and orientation of the first object with respect to the second object to initiate contact between the first object and the second object, a proprioception module operable to measure normal force disparities using data from the sensor between the surface and device motion actuators and modify the deliberate behavior based on normal force disparities, and an exteroception module operable to measure translational resistance disparities using data from the sensor between relative motion of the surface and the device and modify the deliberate behavior based on translational resistance disparities and wherein the proprioception module and the exteroception module control contact between the first object and the second object so as to maintain contact with a predetermined normal force and a predetermined translational resistance.

2. The system for controlling contact between two objects according to claim 1, further comprising a proprioception module operable to measure normal force disparities using data from the sensor between the surface and device motion actuators.

3. The system for controlling contact between two objects according to claim 1, wherein the proprioception module and the exteroception module contour map the surface according to a reactive impedance based behavior.

4. The system for controlling contact between two objects according to claim 1, wherein the proprioception module is configured to operate unilaterally.

5. The system for controlling contact between two objects according to claim 1, wherein the contact sensor is operable to provide visual feedback and wherein changes in optical flow determines relative range between the first object and the surface.

6. The system for controlling contact between two objects according to claim 1, wherein a perceived perpendicular distance between the first object and the surface is determined by a range sensor on the device.

7. The system for controlling contact between two objects according to claim 1, wherein the contact sensor is operable to provide visual feedback and wherein a perceived perpendicular distance between the first object and the surface is determined by a vector scan of the surface.

8. The system for controlling contact between two objects according to claim 1, wherein the exteroception module is configured to operate unilaterally.

9. The system for controlling contact between two objects according to claim 1, wherein the proprioception module and the exteroception module are configured to operate in parallel.

10. The system for controlling contact between two objects according to claim 1, wherein the proprioception module and the exteroception module are configured to operate sequentially.

11. A system for establishing contact between two objects, comprising:
a first object wherein the first object includes a first surface and one or more ultra-wide band (UWB) transceivers; and
a second object, in proximity of the first object, wherein the second object includes a second surface, a contact sensor, at least two ultra-wide band (UWB) transceivers, and a processor configured to execute a plurality of code of instructions, said code of instructions including,
code for analyzing a signal received from the one or more UWB transceivers by the at least two UWB transceivers to determine a relative position of the first object with respect to the second object and a relative position error,
code to select a deliberative behavior to orient the second surface of the second object towards the first object based on the relative position of the first object with respect to the second object and the relative position error,
code to initiate contact between the first surface of the first object and the second surface of the second object,
responsive to the contact sensor sensing contact, code to determine a normal force and a translational resistance between the first surface and the second surface and error associated with the normal force and translational resistance, and
code to select a reactive behavior to maintain contact between the first surface and the second surface based on a predetermined normal force and a predetermined translational resistance and the error associated with the normal force and translational resistance.

12. The system for establishing contact between two objects according to claim 11, further comprising code to determine normal force disparities between the first surface and the second surface.

13. The system for establishing contact between two objects according to claim 12, further comprising code to determine translational resistance disparities between the first surface and the second surface.

14. The system for establishing contact between two objects according to claim 13, wherein determination of translational resistance disparities and normal force disparities are independent.

15. The system for establishing contact between two objects according to claim 13, wherein maintaining contact between the first surface and the second surface include minimizing normal force disparities.

16. The system for establishing contact between two objects according to claim 13, wherein maintaining contact between the first surface and the second surface including minimizing translational resistance disparities.

17. The system for establishing contact between two objects according to claim 11, wherein the second object includes an optical sensor and wherein changes in optical flow between the first surface and the second surface determines relative range prior to contact.

18. The system for establishing contact between two objects according to claim 11, wherein the at least two UWB transceivers are fixed on the second object and use relative range to the one or more UWB transceivers to orient the second object with the first object.

* * * * *